000000000000000
United States Patent Office 3,373,812
Patented Mar. 19, 1968

3,373,812
METHOD OF PERMEABLY CONSOLIDATING INCOMPETENT SANDS WITH A HEAT-CURABLE RESIN
Francis M. Smith, Gibsonia, Pa., assignor to Gulf Research & Development Company, Pittsburgh, Pa., a corporation of Delaware
No Drawing. Filed July 9, 1965, Ser. No. 470,886
3 Claims. (Cl. 166—25)

ABSTRACT OF THE DISCLOSURE

An incompetent formation is permeably consolidated by heating with steam, thereafter displacing a heat-curable resin-forming furfuryl alcohol composition into the heated zone, and continuing to displace steam or a gas such as nitrogen, carbon dioxide and methane through the impregnated formation to maintain permeability while the resin is cured.

---

This invention relates to a method for consolidating loose sand formations, particularly incompetent sand formations surrounding a well bore.

Oil bearing sand formations frequently break down and produce sand in the well bore as a result of insufficient cohesion between adjacent sand particles under the conditions prevailing in the well. These formations may break down during the drilling or well completion operations, or they may produce sand when the well is brought into production as a combined effect of the stresses created by the overburden and the flow velocity of the reservoir fluid. This represents a particular problem in sand formations in which there is inadequate natural cementing material to bind the sand grains together. Since the production of sand by the well fluid is very undesirable, many solutions to this problem have been proposed.

One method that has been used in incompetent formations is the placement of a slotted liner in the formation with gravel packing to hold back the sand particles. Another method involves the introduction of a substance into the incompetent formation adjacent to the well bore to supplement any naturally occurring cement and bind the sand particles together into a rigid but permeable formation. Somewhat severe requirements are placed upon this artificially introduced sand cementing material in order that the formation be adequately consolidated against the conditions which can reasonably be anticipated in well preparation or during oil production. This cementing material must both form a strong bond with the individual sand grains as well as have an adequate internal strength. In order to be effective it must be capable of penetrating the formation a critical distance from the well bore and must not substantially decrease the formation permeability. Also for general utility it is desirable that this material be temperature and moisture resistant and withstand ordinary methods of well stimulation including resistance to hot gases, hot water, steam and treating acids.

Those methods which have been used in dealing with incompetent formations have presented a number of disadvantages. When a slotted liner with gravel packing is used, it has been discovered that the sand particles or fines can migrate and plug up the conducting channels in the gravel pack. Sodium silicate or water glass has been suggested as a cementing substance, but it has been found that formations consolidated with this material disintegrate in the presence of hot water. Slurries or suspensions of various cementing materials rather than true solutions have been tried, but these are not practical with any but the rarely encountered, coarse grain, high permeability formations because the suspended particles will filter off as a cake onto the surface of the formation without any effective penetration into the formation.

Various resin formulations have been used with variable success, however, many problems have arisen in their use. For example, premixing the resin-former with a catalyst places a positive time factor in the operation. Delays or accidents have resulted in the resin polymerizing in the equipment or well bore itself prior to introduction into the formation or in the formation before permeability is regained. In an effort to assure adequate retention of permeability in the treated formation, a flushing liquid may be injected for partial displacement of the resin-forming solution or a liquid diluent used in the formulation itself which is rejected as the resin shrinks onto the sand grains and sets. However, both the adhesive characteristics and the strength of the final resin are adversely affected by these liquid diluents and flushing agents. Successful use of these methods requires great precision with inadequate consolidation or a substantial loss of the formation permeability still a common result.

In accordance with my invention an incompetent formation is consolidated with a resin by a procedure which includes precleaning the formation with steam to insure that the completely cured resin realizes its full potential of adhesive and cohesive bonding strength. A further advantage and benefit of this pretreatment is that the hot steam is capable of cleaning up the well bore and opening up a great multiple of well perforations to permit injection of resin-forming material for consilidation of multiple entry wells, as well as limited or single point entry wells. This is in contrast to the entry of a cold flushing fluid only into the most unrestricted perforations nad consolidation of the formation adjoining these perforations thereby restricting this treatment to limited entry wells. The steam can enter the formation over a wide front to drive out all hydrocarbon liquids from the broad zone to be consolidated and insure that the more uniformly and thoroughly cleaned sand grains present an oil-free, noninterfering surface to the subsequently injected resin-forming material to permit full strength bonding. This invention is of particular economical advantage when used in conjunction with an existing steam stimulation program in an incompetent formation since all of the necessary equipment is already on the site with the cost of the resin-forming material being the main nonlabor consolidation expense. Since steam stimulation usually involves multiple entry wells, my process is of particular practical advantage and utility when used in conjunction with steam stimulation.

A further aspect of my invention involves the use of a stable heat-curable resin-forming material which is injected into the heated formation and is cured by this formation heat. Thus, by using a resin-forming material which is introduced into the well before it is subjected to polymerizing treatment, not only is the need for a separate catalyst or catalytic treatment eliminated, but also the criticality of handling time at the wellhead is avoided. As a resultant, unscheduled delays and variations in handling time can be accommodated without resinification above ground. This permits much greater flexibility in conducting the well operations and relieves the workers of pressures, which might otherwise lead to mistakes and accidents.

After the formation is adequately steam flushed, the resin-forming composition is injected in an appropriate manner, and permeability of the formation is established by the injection of steam, inert liquid or an inert gas. The resin-former may be entrained in the steam at the wellhead and be carried by the steam into the formation where it will deposit out onto the sand grains and harden. Alternatively the resin-former may be injected through a separate conduit to the sand face and be forced into the formation by the steam, inert liquid or inert gas. Another technique involves stopping the steam injection, cooling the well bore then injecting the required amount of resin-former as a slug, followed by the reinjection of steam, or injection of an inert gas such as nitrogen, carbon dioxide, methane and the like or injection of an inert liquid such as diesel oil to regain permeability and prevent backflow of reservoir fluids into the well bore as the resin cures. The reinjection of steam not only assures permeability retention but, in addition, enhances the resin cure due to the supplementation of heat, the latter result being particularly advantageous where the formation is cooler than desired. By these various techniques excess resin-former is displaced deeper into the formation by a nonmiscible drive leaving only a coating on the sand grains, particularly at the intergranular contacts.

By this process close control of the consolidation operation is possible. The resin precursor being stable may be stored for an indefinite period of time without hardening, yet when consolidation is desired, it is immediately usable. A strong intergranular bonding is accomplished to produce a consolidated formation possessing up to 85 percent of its original unconsolidated permeability.

In accordance with my invention a heat-curable resin-former such as furfuryl alcohol, or a fluid partial polymer formed by the homopolymerization of furfuryl alcohol with another substance is injected into the formation to be consolidated, and this is subsequently fully cured by the heat in the formation to a strongly adherent polymer. Furfuryl alcohol is a very fluid substance having a viscosity of 4.6 centipoises at 25° C. It is volatile at ambient conditions with a boiling point of 170° C. and is infinitely soluble in water. Its physical properties can be adjusted by partial polymerization under controlled conditions to produce a prepolymer having a viscosity of any desired value, for example, up to one thousand centipoises or more together with a lowered vapor pressure and water solubility.

A slow curing or a retarded resin-forming composition may be used in order to insure proper placement in the formation prior to cure hardening of the resin-former by well bore heat. For example, the addition of from about five to 80 percent of an unsaturated fatty acid such as linseed oil, which is preferred because of its low cost, to furfuryl alcohol will retard its curing time proportional to the amount of retarder present. Since furfuryl alcohol and linseed oil are essentially immiscible, from about 50 to 100 percent, based on the linseed oil, of an aromatic solvent, such as benzene or toluene, is used to make the retarded resin-forming composition. In addition, tetrahydrofurfuryl alcohol and furfurin cure to a resin much slower than furfuryl alcohol at comparable temperatures and may be used alone as the resin-former, or may be added as a retarder in suitable proportions to the faster acting material. An alternate procedure involves the injection of a sufficient amount of cool water into the well to cool the well bore as determined by a downhole thermocouple. For example, the downhole temperature should be reduced to about 300° F. when unretarded furfuryl alcohol is to be used.

A furfuryl alcohol prepolymer useful herein can be prepared by the controlled self-condensation of furfuryl alcohol. For example, an amount of furfuryl alcohol can be heated at reflux with ten percent by weight of a 4.25 percent phosphoric acid solution. Reflux is continued for several hours until the desired viscosity is reached. When using this more viscous prepolymer or other resin-forming composition, it is preferred that up to about one percent of a surfactant such as isooctylamine be incorporated into the material in order to insure complete wetting of the formation particles. The viscosity of a partial polymer can be decreased for use herein by dilution with furfuryl alcohol, which co-cures with the partial polymer, and with a suitable retarder added in an amount as needed.

In addition, those liquid partial copolymerization products of furfuryl alcohol with other substances which are heat-curable are usable herein. Examples of this group are partial polymers of furfuryl alcohol with formaldehyde, with urea and formaldehyde, with phenol and formaldehyde and with one or more compounds containing two or more epoxy groups. Such mixed partial polymers are well-known in the art, a specific example being the stable, liquid partial polymer made from about 100 parts by weight of furfuryl alcohol, about 54 parts formaldehyde, and about three parts urea. In another example a mixture of 100 parts by weight of Epon 828, an epoxy resin-former made by Shell Chemical Company, ten parts of furfuryl alcohol, and three parts of boron trifluoride monoethylamine forms a stable mixture having a viscosity of 660 centipoises at 27° C. which will cure to a hard resin above 85° C. Other suitable epoxy resin-formers include Union Carbide Company's ERL 2774 and E.P. 201 (3,4-epoxy - 6 - methyl-cyclohexylmethyl-3,4-epoxy-6-methylcyclohexanecarboxylate). In general, these partial copolymers will be made from at least about ten percent furfuryl alcohol and will generally vary in viscosity from 100 to 10,000 centipoises. Formulations of this type or information regarding them are available from The Quaker Oats Company, an example being Furset 4090, a furfuryl alcohol-urea-formaldehyde reaction product having a viscosity of approximately 750 centipoises.

In consolidating sand formations hereunder, the formation is first steam cleaned by injecting steam a sufficient period of time, preferably at least for twenty-four hours, to heat and clean the zone to be consolidated. The steam temperature may vary between about 300° and 700° F. which represent pressures of 67 p.s.i.a. and 3094 p.s.i.a. respectively provided that the steam pressure must be sufficiently in excess of the formation pressure to get an adequate rate of injection. The resin-former is then injected by entrainment in the steam or by separate injection and displacement using steam or an inert gas or liquid as described. A pressure is maintained in the well to prevent backflow of reservoir fluids into the well while curing takes place and to insure maintenance of permeability. After polymerization, the well is ready for production or continued steam stimulation or other treatment as determined by sound well management.

The following test demonstrates my invention. A tubing two feet long and 2¼ inches in diameter was packed with 70–140 mesh oil-saturated sand. The tube was placed in an oven and 100 percent quality steam at 500° F. and 665 p.s.i. was injected at a rate of 40 cc./min. for two hours. The steam rate was then reduced to 14 cc./min. and a mixture containing 50 volume percent furfuryl alcohol, 25 percent linseed oil and 25 percent benzene was simultaneously injected. The total volume of furfuryl alcohol mixture was 250 cc. which represented one-half of the pore volume. After displacement of the mixture, steam injection was stopped and the sand pack held at 500° F. for 15½ hours to permit the resin to cure. Steam injection was then resumed at a rate of 14 cc./min. for 8½ hours to determine whether steam degraded the cured resin after which the tube was removed from the oven, dissembled and the contents evaluated while hot. It was ascertained that the average permeability was 2.5 darcies. The consolidated sand was not degraded and possessed an average compressive strength of 636 p.s.i. which was maintained after boiling in water for 24 hours.

The preferred temperatures for curing furfuryl alcohol and furfuryl alcohol prepolymer is between about 350° to 550° F. with about 375° to 425° F. being the optimum range. I have found that the resin might still be tacky after 24-hour hot gas treatment at 300° F. while the cure at 600° F. is sufficiently rapid that excessive heating may cause a gradual degradation of the cured resin. At 400° F. the curing time is approximately four hours. The curing temperature for the copolymeric materials is a function of each specific formulation. The retarding effect of linseed oil on furfuryl alcohol is illustrated in the following table in which benzene is included in the composition to insure miscibility in an amount equal to the volume of linseed oil used.

| Curing Temp., °F. | Linseed Oil Content a | Time for Full Cure, Hours |
|---|---|---|
| 450 | 5 | 7 |
|  | 10 | 13.5 |
|  | 15 | 20 |
| 500 | 15 | 4 |
|  | 20 | 8 |
|  | 27 | 13 |
|  | 35 | 19 |
| 550 | 35 | 7 |
|  | 40 | 10 |
|  | 48 | 16 |
|  | 60 | 24.5 | a Volume percent based on furfuryl alcohol.

It can be seen from this table that a small change in the linseed oil content at a given temperature will provide a significant effect on the curing time, while a small change in curing temperature will have a significant effect on the curing time for a given composition.

In consolidating with these resin-forming materials average compressive strengths greater than 500 p.s.i. are readily obtainable with compressive strengths over 2000 p.s.i. with acceptable permeabilities resulting at optimum conditions. A final permeability of at least about 60 to 85 percent of the original permeability is desired with the permeability retention in part being dependent upon the initial viscosity of the treating solution, the effectiveness of the resin-former displacement, and the rate of cure of the resin at the curing temperature. It is also contemplated that a low permeability or impermeable underground consolidated formation may be produced by my process by steam heating the formation and injecting the resin-former without flushing with a permeability regaining fluid in conjunction with or following the resin-former injection. In this modification higher average compressive strengths are readily attainable because the consolidated formation contains more resin per unit volume.

The time it takes for complete resinification is primarily controlled by the temperature at which curing is effected, and this is primarily dependent on the formulation used. Since the curing rate increases with increasing formation temperature and pressure, these should be correlated with the formulation in order to accomplish the desired result. It is preferred when using furfuryl alcohol base materials that the formation temperature be no greater than 700° F. and preferably less than 600° F. so that over curing will not occur. If the formation temperature is higher than desired, a cooling flush such as a cool inert gas may be used to cool the formation to the desired temperature prior to injection of the resin-former. Furfuryl alcohol monomer is more sensitive to formation conditions than the prepolymer mixture. An elevated temperature in the formation together with a low formation pressure may result in significant evaporation and loss of the monomer necessitating under these conditions the use of a suitable prepolymer or retarded formulation or a cooling of the formation or a combination of these techniques. When over cooling of the formation has occurred either by design or through inadvertance, it may be necessary to follow up the treating liquid with the reinjection of steam to heat the resin-former to the desired curing range.

The process is now illustrated in the consolidation of a 30-foot pay zone lying between the interval of 2050 feet to 2100 feet in a well scheduled for steam stimulation. The casing is perforated between the interval of 2060 feet to 2090 feet. The pressure of the formation is 840 p.s.i.g. A plug is inserted at the 2100-foot level and an open-end tubing with a packer is run into the well with the tubing end at the bottom of the perforations and the packer set about 20 feet above the perforations. A thermocouple is run into the tubing below the packer depth. Eighty percent quality steam at 989 p.s.i.g. and 545° F. is injected into the well for about 120 hours at a rate of about 20,000 lbs./hr. The rate is then reduced to about 2900 lbs./hr. at a pressure of about 989 p.s.i. to approximately compensate for heat loss. Ten barrels of a mixture consisting of 44 volume percent furfuryl alcohol, 28 percent linseed oil, and 28 percent benzene which will cure in about ten hours at the downhole temperature of 545° F. as determined by thermocouple measurement is injected into the tubing at a rate of one-half barrel per minute. After the total mixture is displaced into the tubing, steam injection is stopped. The mixture is displaced into the formation with nitrogen gas which is injected at a rate of 150 s.c.f.m. for ten hours to insure permeability retention while the resin cures. After the resin is fully cured, the thermocouple and the tubing and packer are removed and steam is injected into the well to thermally stimulate the reservoir for secondary recovery of the oil.

In an alternative procedure hereunder, steam is used to cure the heat-curable resin-former which has been injected into a cool formation. In this instance the formation has preferably been precleaned or treated prior to injection of the resin-former such as by an oil solvent flush, by burning and cooling or by steam cleaning and cooling. The injected steam will drive excess resin-former deeper into the formation to insure permeability retention and will heat cure the film remaining as a coating on the sand grains.

Although furfuryl alcohol is completely miscible with water in all proportions, a solution of the two is only accomplished with some difficulty. Thus, in the injection of steam or hot water into a zone impregnated with furfuryl alcohol, only slight dissolution of water and furfuryl alcohol will occur. Partial polymerization of the furfuryl alcohol substantially diminishes its water solubility. When furfuryl alcohol is injected into a wet formation, it will preferentially wet the sand grains and eject the water. Therefore, the presence of water does not interfere with the success of the process.

As used herein, steam refers to the various conditions in which it may be used or exists. Thus, the term includes the injection of superheated steam as well as steam-water mixtures, that is less than 100 percent quality steam. In addition, temperature and pressure reductions occur in the process of transporting steam down the well and into the formation. Thus, steam injection at the wellhead may result in steam injection into the formation, or the injection of steam-water mixtures or hot water alone. Therefore, the use herein of the word "steam" is intended to include the injection of steam, steam and water, or hot water. As used herein, inert gas refers to those gases which are nonreactive with the resin-forming material and the cured resin at the conditions of use and includes nitrogen, carbon dioxide, methane, exhaust gases and the like and includes air when used at nonreactive conditions.

Sand formations consolidated by the steam pre-cleaning technique described herein possess excellent permeability and strength in part resulting from the good penetration of the steam into the formation, and in part from the flushing action of the steam which permits good adhesion of the resin to the formation particles over a wide zone. The consolidated formation displays excellent resistance to hexane, benzene, water and reservoir fluids. Further, it retains these properties as long as formation temperatures do not appreciably exceed 600° F. and may be subjected to stimulation techniques such as steam injection and acid stimulation without deterioration. This process is generally useful for the consolidation of underground loose granular formations.

It is to be understood that the above disclosure is by way of specific example and that numerous modifications and variations are available to those of ordinary skill in

I claim:

1. A method for permeably consolidating incompetent, permeable oil-bearing formations adjacent to underground boreholes which comprises the steps of injecting steam at a temperature between about 300° and 700° F. into the formation in a zone adjacent to the borehole, injecting a heat-curable resin-forming liquid selected from the group consisting of furfuryl alcohol, prepolymers of furfuryl alcohol, and partial copolymers of furfuryl alcohol with a composition selected from the group consisting of formaldehyde, urea formaldehyde, phenol formaldehyde, and compounds having two or more epoxy groups into the heated zone, injecting steam into the formation to displace a portion of said resin-forming material further into said formation and reestablish the permeability of said heated zone, and pressuring said well for sufficient time to permit the resin-forming material to polymerize and consolidate said formation.

2. A method for permeably consolidating incompetent, permeable oil-bearing formations adjacent to the underground boreholes which comprises the steps of injecting steam at a temperature between about 300° and 700° F. into the formation in a zone adjacent to the borehole, entraining a heat-curable, resin-forming liquid selected from the group consisting of furfuryl alcohol, prepolymers of furfuryl alcohol, and partial copolymers of furfuryl alcohol with a composition selected from the group consisting of formaldehyde, urea formaldehyde, phenol formaldehyde, and compounds having two or more epoxy groups into said steam and injecting the mixture into said formation, and permitting said resin-forming material to polymerize and consolidate said formation.

3. A method for permeably consolidating incompetent subsurface formations penetrated by the borehole of a well comprising displacing down the well and into said incompetent formation steam to heat the formation to a temperature of 350° to 550° F., continuing the injection of steam and entraining in the steam furfuryl alcohol and a compound retarding the setting of furfuryl alcohol, and thereafter displacing an inert gas down the well and through the impregnated formation to maintain permeability until the furfuryl alcohol sets to consolidate the formation.

References Cited

UNITED STATES PATENTS

| | | | |
|---|---|---|---|
| 2,378,817 | 6/1945 | Wrightsman et al. | 166—33 |
| 2,399,055 | 4/1946 | Nordlander | 260—67 X |
| 2,787,325 | 4/1957 | Holbrook | 166—33 X |
| 2,796,934 | 6/1957 | Vogel | 166—33 |
| 2,799,341 | 7/1957 | Maly | 166—33 X |
| 3,087,544 | 4/1963 | Forsman | 166—33 |
| 3,126,959 | 3/1964 | Ortloff | 166—33 |
| 3,199,590 | 8/1965 | Young | 166—33 |
| 3,219,110 | 11/1965 | Martin et al. | 166—25 X |

CHARLES E. O'CONNELL, *Primary Examiner.*

IAN A. CALVERT, *Assistant Examiner.*